US011797493B1

(12) United States Patent
Crimi

(10) Patent No.: US 11,797,493 B1
(45) Date of Patent: Oct. 24, 2023

(54) CLUSTERED FILE SYSTEM FOR DISTRIBUTED DATA STORAGE AND ACCESS

(71) Applicant: Code Willing, Inc., Baton Rouge, LA (US)

(72) Inventor: Thomas Crimi, New Orleans, LA (US)

(73) Assignee: Code Willing, Inc., Baton Rouge, LA (US)

( * ) Notice: Subject to any disclaimer, the term of this patent is extended or adjusted under 35 U.S.C. 154(b) by 0 days.

(21) Appl. No.: 17/864,128

(22) Filed: Jul. 13, 2022

(51) Int. Cl.
| | |
|---|---|
| G06F 16/00 | (2019.01) |
| G06F 16/185 | (2019.01) |
| G06F 16/13 | (2019.01) |
| G06F 16/16 | (2019.01) |
| G06F 16/182 | (2019.01) |

(52) U.S. Cl.
CPC .......... *G06F 16/185* (2019.01); *G06F 16/137* (2019.01); *G06F 16/164* (2019.01); *G06F 16/182* (2019.01)

(58) Field of Classification Search
CPC .... G06F 16/185; G06F 16/182; G06F 16/164; G06F 16/137
See application file for complete search history.

(56) References Cited

U.S. PATENT DOCUMENTS

| | | | | |
|---|---|---|---|---|
| 9,081,792 | B1* | 7/2015 | Williams | G06F 3/0619 |
| 2009/0144422 | A1* | 6/2009 | Chatley | G06F 3/0613 |
| | | | | 709/226 |
| 2012/0246125 | A1* | 9/2012 | Kato | G06F 16/1748 |
| | | | | 707/E17.005 |
| 2017/0272209 | A1* | 9/2017 | Yanovsky | G06F 12/0253 |
| 2021/0224233 | A1* | 7/2021 | Bafna | G06F 16/164 |
| 2022/0188719 | A1* | 6/2022 | Ramaswamy | G06F 21/552 |

* cited by examiner

*Primary Examiner* — Tony Mahmoudi
*Assistant Examiner* — Suman Rajaputra
(74) *Attorney, Agent, or Firm* — Perkins Coie LLP

(57) ABSTRACT

Devices, systems, and methods for optimizing file storage in a distributed data storage and access system are described. One example system includes a centralized server, coupled to a storage server, configured to transmit, to the storage server, file storage instructions causing the storage server to store a plurality of files and corresponding file identifiers in a hierarchical directory structure. The file storage instructions cause the storage server, as part of storing the plurality of files, to automatically associate the file identifier with the file based on comparing a size of the file to an adaptive threshold value. In response to the size being less than the adaptive threshold value, the file identifier is set using a hash value of the file, and in response to the size being greater than the adaptive threshold value, the file identifier is set using at least a timestamp of the centralized server.

29 Claims, 6 Drawing Sheets

CLUSTERED FILE SYSTEM FOR DISTRIBUTED DATA STORAGE AND ACCESS

BACKGROUND

A distributed storage system is infrastructure that can split data across multiple physical servers, and often across more than one data center. Data is often stored in a replicated fashion to provide redundancy and resiliency. A distributed data storage system may typically take the form of a cluster of storage units, with a mechanism for data synchronization and coordination between cluster nodes.

SUMMARY

This document relates to methods, systems, and devices for a clustered file system that supports distributed data storage and access. Implementations of the present technology enables technical solutions for working with large amounts of data stored either on-premises or on cloud storage. The described implementations provide, inter alia, benefits and advantages, which include storage savings by using smart content hashing, higher task completion rates by using a job/queue-based autoscaler, and limiting access to specific files by controlling user access down to the file level.

In yet another example aspect, the methods described in this document are embodied in the form of processor-executable code and stored in a computer-readable program medium.

In yet another example aspect, a device that is configured or operable to perform the methods described in this document is disclosed.

The above and other aspects and their implementations are described in greater detail in the drawings, the descriptions, and the claims.

DETAILED DESCRIPTION

Figure 1:
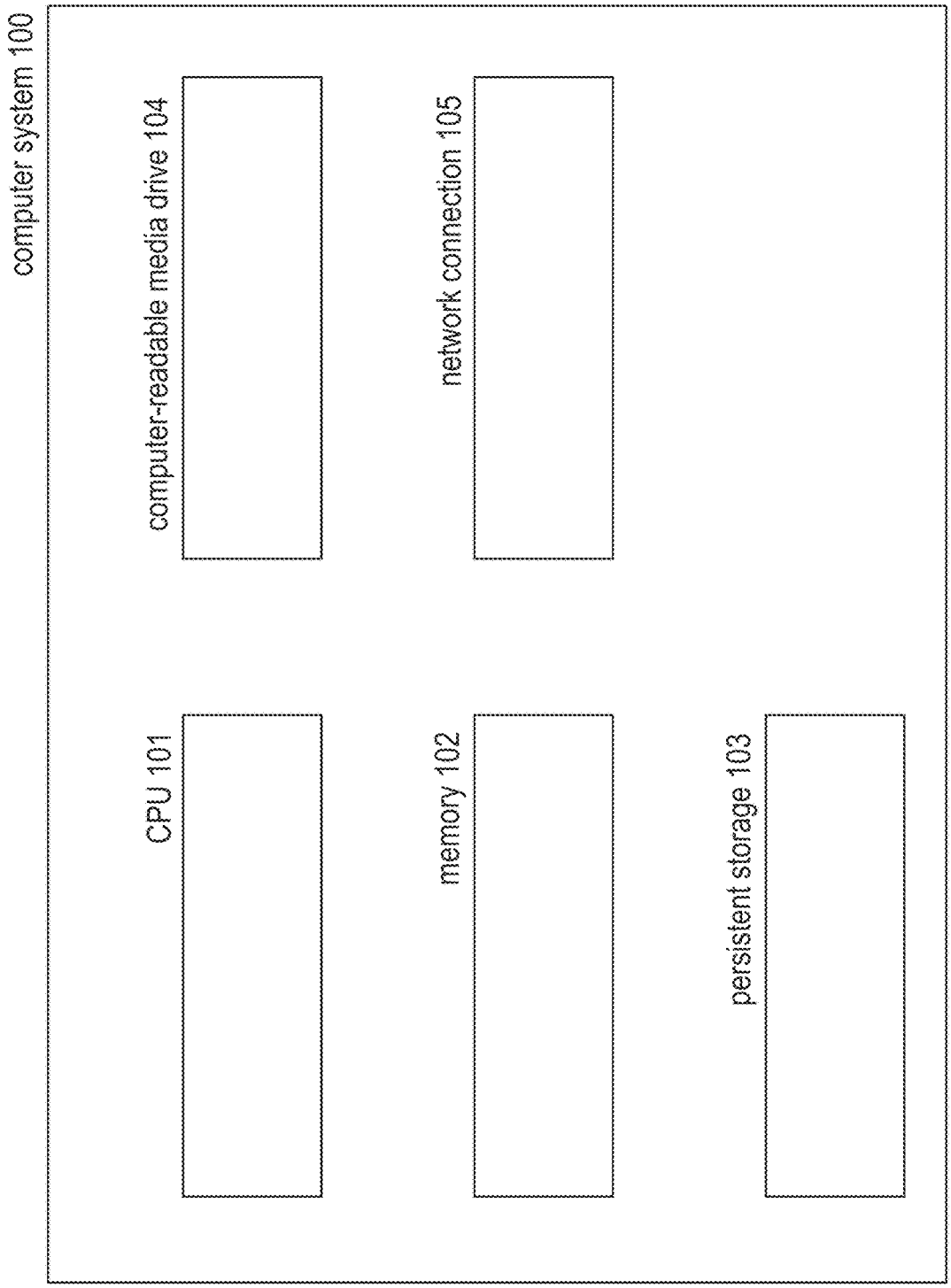
FIG. 1 is a block diagram showing some of the components typically incorporated in at least some of the computer systems and other devices on which the disclosed system operates in accordance with some implementations of the present technology.

Existing data management software solutions are inefficient and resource intensive. For instance, existing data management software solutions that work with data stored on one type of local storage typically need to change a vast amount of their existing codebase to access data stored on other storage sources. For example, existing solutions need to use different storage-specific APIs to include the data on each storage in their analysis. Further, the scalability and security components developed for existing solutions are limited to (and customized for) each application, resulting in the inability to quickly and easily access new storage infrastructure improvements. The lack of scalability may result in multiple clients pulling data from a few common servers, thereby resulting in bottlenecks and degradation in performance and reliability. Manual access to the data would be possible only through storage-specific software.

To solve these and other problems with existing solutions, the inventors have conceived and reduced to practice a single global file system (denoted CASFS or CASFS+) that is capable of spanning hundreds of machines, managing billions of files, petabytes of data, and delivering the full aggregate bandwidth of managed object stores. This shared file system maintains consistency over all clients at all times, with the updated metadata being visible to all clients in real-time. The file system supports access control lists (ACLs) as well as specialized access modes, and has a non-root superuser mode for giving users full access over the file system without enabling them to become root.

In some implementations, CASFS can store data, executables, and user home directories. Users can utilize CASFS as their home directories, housing their source code and data durably across all machines. No additional APIs or commands are necessary in order to work with the file system. There is no need to mount/unmount the file system by the end user, and no extra procedures for entering/exiting the file system. This allows the applications and users to lift and shift their existing infrastructure and work with the data that exists in various different cloud storage solutions and/or on-premises data stores. Furthermore, metadata is updated in real-time across all machines so that a cluster can see a consistent view of the world, e.g., files written on one machine are immediately visible to all other machines. Additionally, storing the configuration files and executables in CASFS advantageously simplifies distribution of applications amongst users. Users can modify and test applications and configurations without building docker images, which is the existing alternative implementation.

In some implementations, CASFS includes a metadata server that is coupled to a client terminal and a storage server. In this implementation, the client terminal and storage server are not part of CASFS, whereas alternative implementations of CASFS may include one or more client terminals and one or more storage servers. The storage server is configured to store files in a hierarchical directory structure, with each file being stored in conjunction with a file identifier. In one example, the storage server creates the file identifier for a file based on the size of the file, whereas in another example, the metadata server can provide instructions to the storage server to create the file identifier based on the file size. If the file size is less than an adaptive threshold value, the file identifier is created using a hash file of the file, whereas if the file size is greater than or equal to the adaptive threshold value, the file identifier is created using at least a timestamp associated with one or more of the file, the system, or the metadata server. In an example, the adaptive threshold value is based on two or more of: a source data set of the file, a type of data in the file, an application that generated the file, or an application that is using the file.

The metadata server is configured to receive a request for list of files in a particular directory of the hierarchical directory structure from the client terminal. The metadata server is configured to only allow the client terminal access to those files that it has the permissions to access. To that end, the metadata server uses a rule set (which can include an access rule set and/or a security rule set) associated with the client terminal to identify a subset of files in the directory that the client terminal has permissions to access. For this subset of files, the metadata server transmits the listing of those files for display at the client terminal and the files for storage in a local cache of the of the client terminal. The size of the subset of files is less than the size of the files in the directory because the client terminal does not have the permissions to access all the files in the directory. The metadata server creates a log entry for both the listing of the subset of files that was transmitted to the client terminal, as well as for the subset of files themselves.

The above-described implementation provides benefits and advantages over existing distributed storage systems which include, inter alia, limiting access to specific files by controlling user access down to the file level, tracking costs spent on cloud storage by creating audit logs for every file access and download, minimizing storage duplication by selectively using hash values when saving the files on the storage server, and using the adaptive threshold value to improve the efficiency of accessing more frequently used files.

Section headings are used in the present document to improve readability of the description and do not in any way limit the discussion or embodiments (and/or implementations) to the respective sections only.

Example Architecture of the Distributed Data Storage and Access System

FIG. 1 is a block diagram showing some of the components typically incorporated in at least some of the computer systems and other devices on which the disclosed system operates. In various implementations, these computer systems and other devices 100 can include server computer systems, desktop computer systems, laptop computer systems, netbooks, mobile phones, personal digital assistants, televisions, cameras, automobile computers, electronic media players, etc. In various implementations, the computer systems and devices include zero or more of each of the following: a central processing unit (CPU) 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; computer-readable media drives 104 that are tangible storage means that do not include a transitory, propagating signal, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
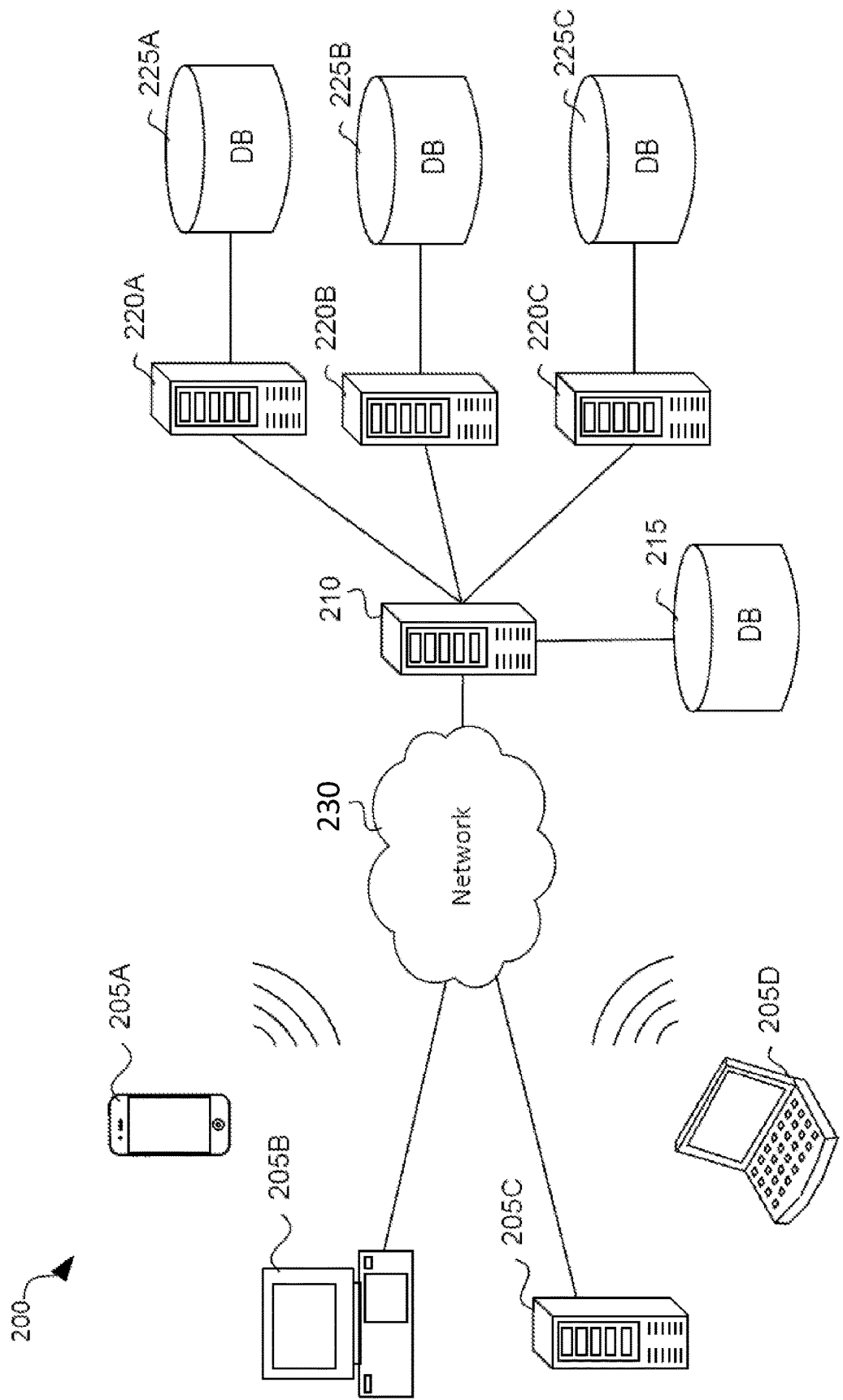
FIG. 2 is a system diagram illustrating an example of a computing environment in which the disclosed system operates in some implementations of the present technology.

FIG. 2 is a system diagram illustrating an example of a computing environment in which the disclosed system operates in some implementations. In some implementations, environment 200 includes one or more client computing devices 205A-D, examples of which can host the system 100. Client computing devices 205 operate in a networked environment using logical connections through network 230 to one or more remote computers, such as a server computing device.

In some implementations, server 210 is an edge server which receives client requests and coordinates fulfillment of those requests through other servers, such as servers 220A-C. In some implementations, server computing devices 210 and 220 comprise computing systems, such as the system 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server or client devices. In some implementations, servers (210, 220A-C) connect to a corresponding database (215, 225A-C). As discussed above, each server 220 can correspond to a group of servers, and each of these servers can share a database or can have its own database. Databases 215 and 225 warehouse (e.g., store) information such as home information, recent sales, home attributes, and so on. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. In some implementations, network 230 is the Internet or some other public or private network. Client computing devices 205 are connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
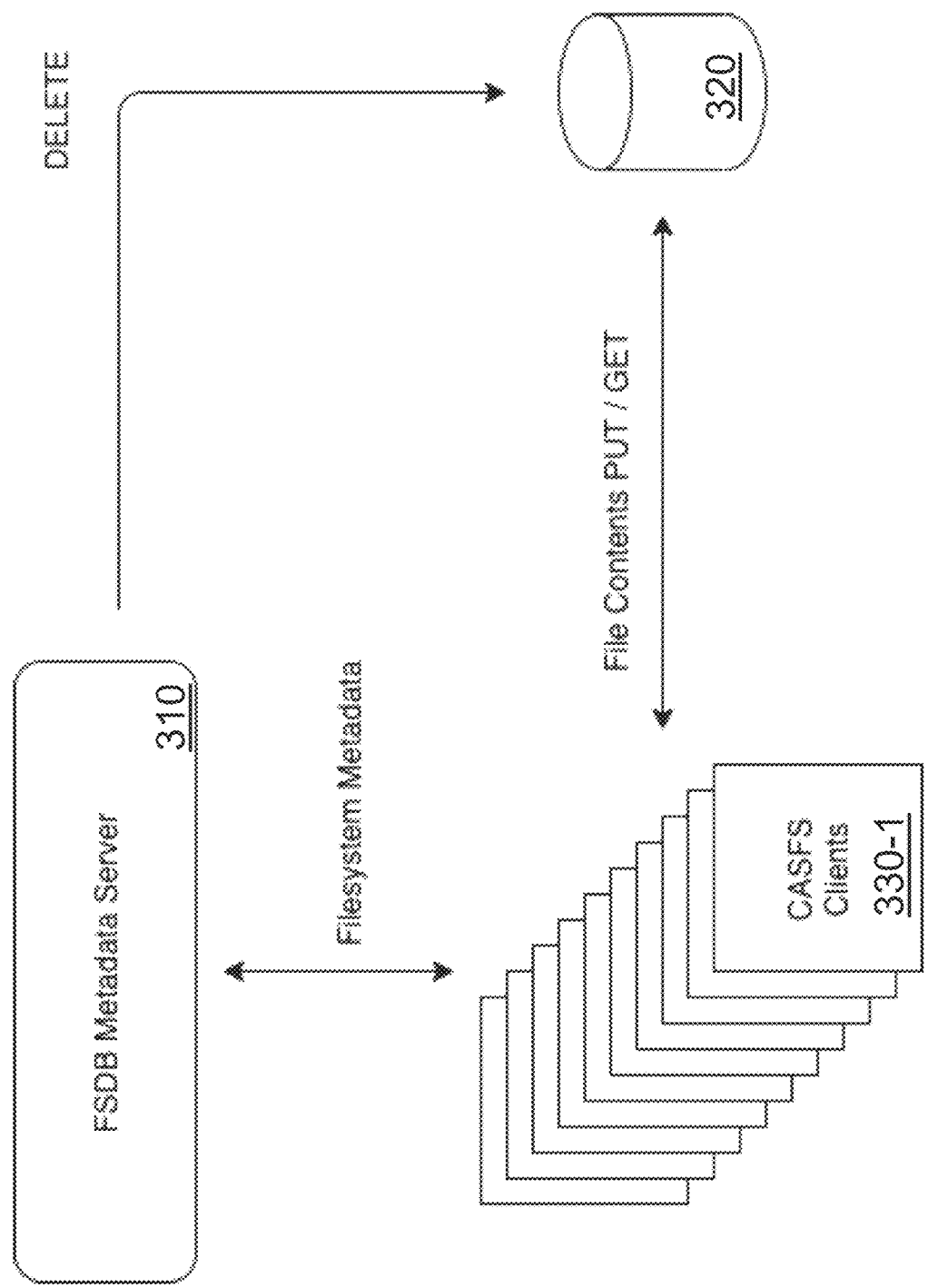
FIG. 3 shows a block diagram of an example distributed storage system architecture.

FIG. 3 shows a block diagram of an example distributed storage system architecture. As shown therein, CASFS is built on a client-server model. A metadata server 310 houses the inodes (e.g., a data structure in a Unix-style file system that describes a file-system object such as a file or a directory, and which stores the attributes and disk block locations of the object's data) and directory entries, and answers file system requests from one or more CASFS client(s) 330-1. In some implementations, the CASFS client 330-1 presents a POSIX®-like file system to the end-user while storing all file content data in an object or block store, such as a cloud-based storage system (e.g., Amazon S3®, Azure Blob® storage, etc.) or a local file system (e.g., General Parallel File System (GPFS)™). Data is written into the storage server 320 (or filestore) using either an SHA256 key or a universally unique identifier (UUID), which advantageously ensures that the storage server 320 does not need to support atomic overwrites and is not responsible for the consistency of the file system. This architecture also allows data to be cached locally on the client (e.g., 330-1) or distributed among multiple storage devices without any specific client needing to worry about having the most recent copy of a particular file. In some implementations, the metadata server 310 and/or one or more of the client terminals (330-1, . . . ) can be implemented as the computer system shown in FIG. 1.

Figure 4A:
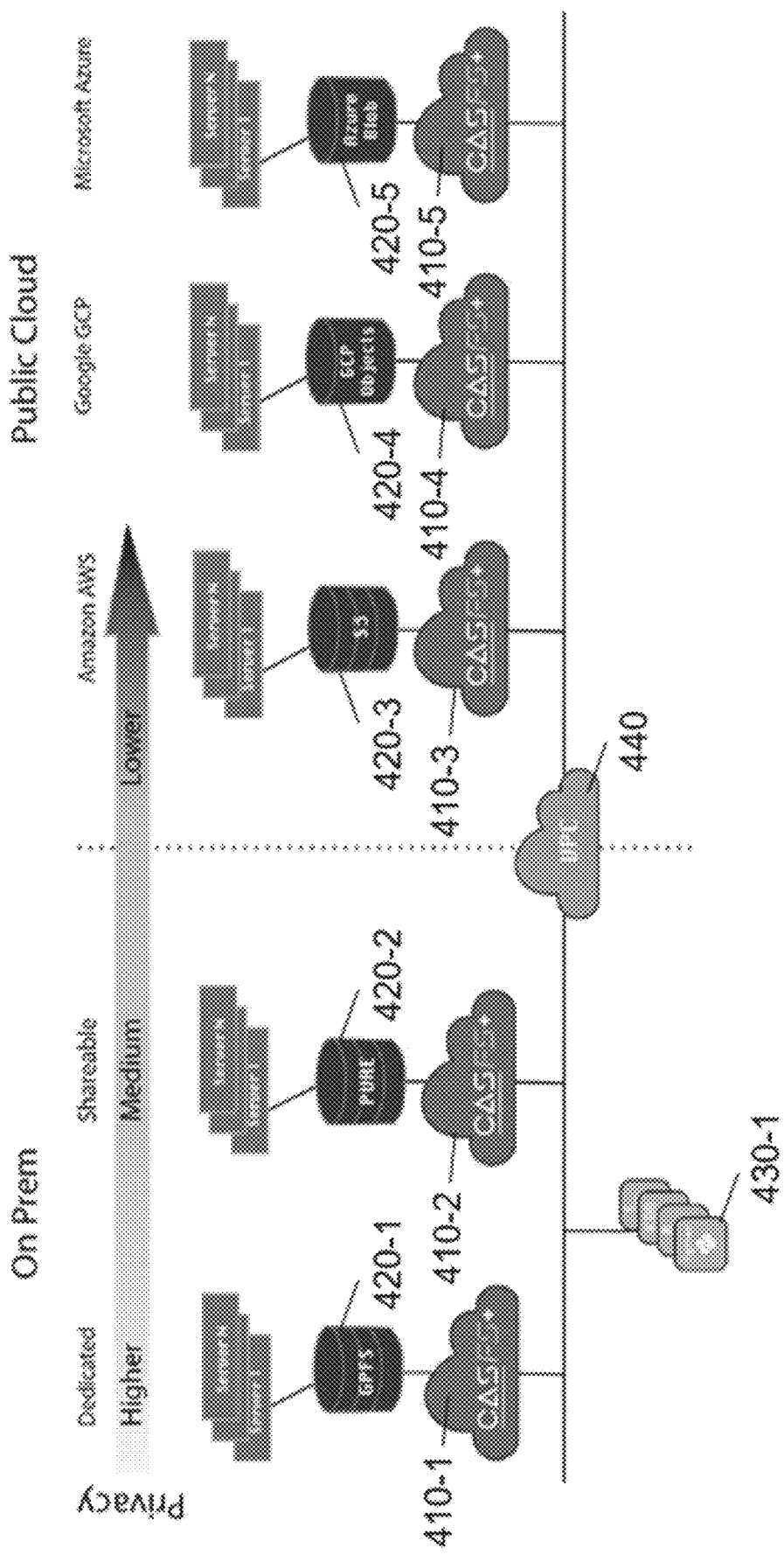
FIGS. 4A and 4B show block diagrams of other example distributed storage system architectures.
Figure 4B:
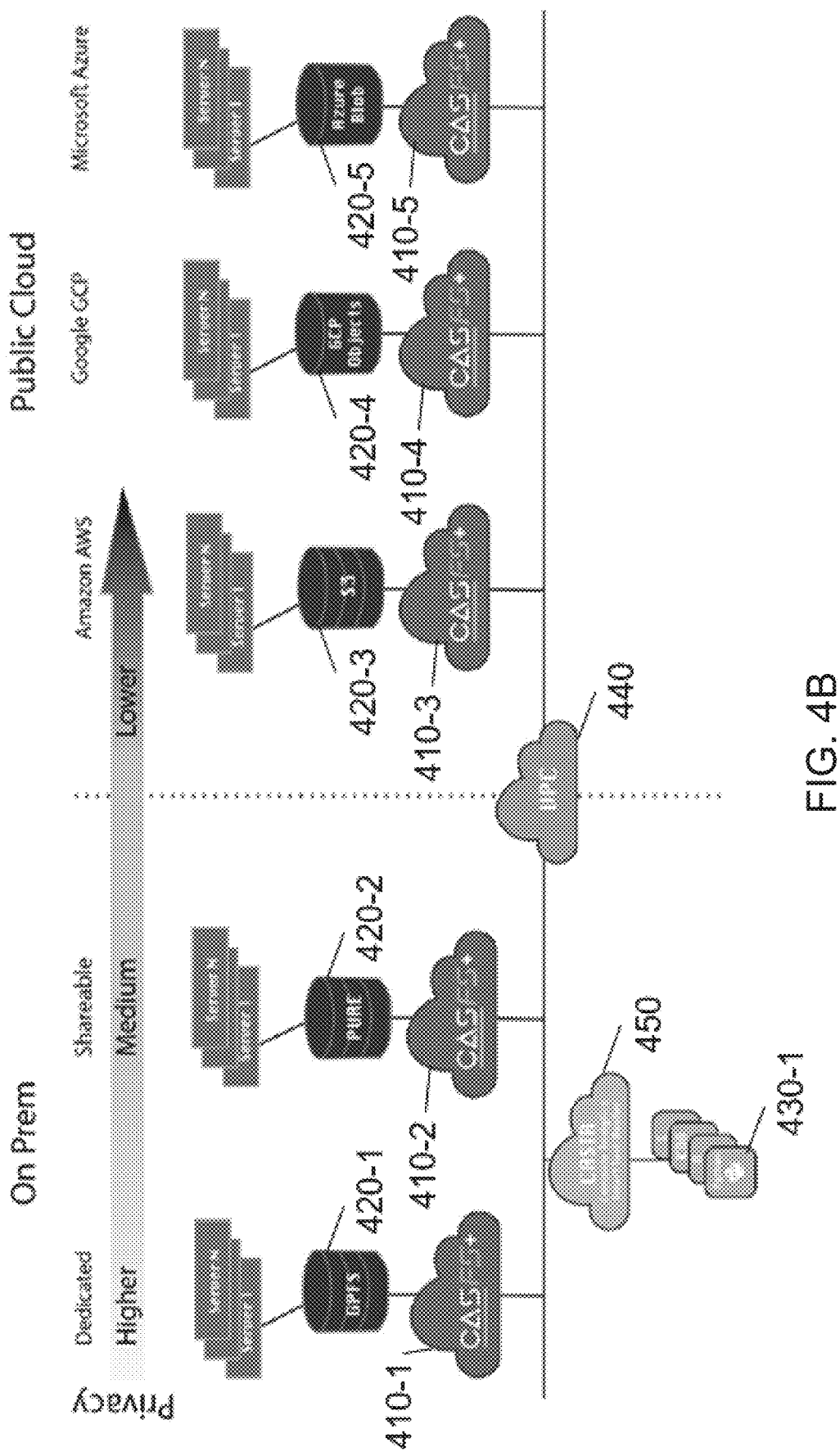

FIGS. 4A and 4B show block diagrams of other example distributed storage system architectures according to some implementations of the present technology. FIG. 4A shows an example of implementations of the present technology (410-1, 410-2, . . . , 410-5) interfacing with a variety of different storage server implementations, which range from on-premises implementations with higher levels of privacy (e.g., GPFS™ 420-1) to public cloud storage implementations with lower privacy capabilities (e.g., Azure Blob® 420-5). In this example, the different storage server implementations that are supported by the described implementations include GPFS™ (420-1), Pure Storage® (420-2, which is an example of flash-based storage for data centers), Amazon S3® (420-3), Google Cloud Platform® (GCP) Objects (420-4), and Azure Blob® (420-5), each of which is communicatively coupled to a respective CASFS. The CASFS implementations are coupled to client services (430-1, e.g., a Python® front-end) and a virtual private cloud (VPC 440), which is an on-demand configurable pool of shared resources allocated within a public cloud environment, providing a certain level of isolation between the different organizations using the resources. The client services (e.g., 430-1) and metadata server (e.g., 410-1) only refer to a storage identifier, regardless of the specific protocol or specific storage server implementation used, and support a set of common functions, e.g., "put" and "get" for the client, and "delete" for the server.

In some implementations, and for certain storage server implementations that use HTTP-based protocols, e.g., Amazon S3®, the server builds and signs the URL the client will use, which prevents the client from having any authentication keys or secrets. This enables the server to select which bucket or endpoint on the storage server the client may use and/or access.

FIG. 4B shows another example of a distributed storage system architecture, which is similar to that illustrated in FIG. 4A. As shown therein, the CASFS implementations (410-1, 410-2, . . . , 410-5) can support three tiers of compute resources: (1) on-premises dedicated clusters, which are prepaid resources that are always available but have fixed capacity, (2) on-premises group shared clusters, which are available to groups for on-demand usage, and (3) public cloud implementations (e.g., AWS®, GCP®, Azure®), which are all available for use based on resource availability and costs. In addition to the architecture shown in FIG. 4A, the example shown in FIG. 4B includes a Compute Analytics Smart Task Router (CASTR), which helps clients optimize their budget usage by routing tasks to the "best compute destination" based on one or more of the cost and time of task completion at a destination, privacy restrictions on dedicated versus group shared versus public destinations, data availability at the destinations, or specialized compute resource availability at the destinations.

In some implementations, the network architecture shown in FIG. 2 can be configured to operate as a distributed storage system architecture (as shown in FIGS. 4A and 4B) based on the presently disclosed technology. For example, the databases 225X correspond to the storage servers, and computing servers 220X correspond to the CASFS implementations for the respective storage servers. Computing server 210, database 215 and network 230 correspond to the virtual private cloud, and client computing devices 205X correspond to the client terminals.

Client-side CASFS. In some implementations, CASFS clients are Filesystem in USErspace (FUSE)-based file systems installed on all client nodes. Clients may store credentials to login to the metadata server, but do not store sensitive information such as storage credentials. Furthermore, clients maintain a TCP connection to the metadata server and communicate file system operations via the HTTP protocol.

In some implementations, clients can be configured to cache files and metadata locally to minimize communications to the metadata server and the storage server. Metadata checks advantageously ensure that the cached files are never stale.

In some implementations, the client can be configured to be in charge of file creation and modification on the storage server. For example, files larger than a certain size can be uploaded in parts to improve the upload speed, and file downloads from storage are performed by the client. However, in this implementation, deleting files from the storage server is handled by the metadata server. In some implementations, a two-phase deletion protocol is supported, which prevents a new file with the same file identifier (e.g., blob_id) as a recently deleted file to be deleted in response to a DELETE command sent to the storage server.

Server-side FSDB. In some implementations, the metadata server is configured using the flatfile streaming database (FSDB) class, which is accessible by clients on a configured port. Metadata operations are carried out on FSDB, and metadata is stored on the disk. FSDB maintains the users and their restrictions (e.g., security rule sets and access rule sets), and all permission checks are passed through FSDB to always be based on the latest user roles. The user configurations and permissions can be modified and reloaded as necessary.

In the described implementations, the FSDB acts as a single-threaded arbiter for all writes and atomic operations, with read-only operations being processed by background threads.

Example Features of the Distributed Data Storage and Access System

The implementations discussed in FIGS. 3, 4A and 4B, and the implementations discussed in the following section can be configured to implement one or more of the features described in this section.

In some implementations, CASFS runs a segregated metadata server (e.g., FSDB), which is responsible for maintaining system security. In an example, the FSDB maintains the secret keys for the storage server and provides clients with signed URLs for individual requests, which results in the clients only being able to read and write the specific files it has requested.

Data Hiding. In some implementations, CASFS implements POSIX® ACLs for file read/write access control and data hiding, which enables users to only view files they have permissions for. In an example, if a user does not have read-access to a file/directory, and data-hiding is turned on at the directory level, the user will not see the file/directory listed, i.e., the file is effectively hidden. This can be useful for providing users a menu of confidential data.

Date-Range Restrictions. In some implementations, CASFS provides access control in the form of date-range restrictions. A user can be provisioned to be able to access data within a date range (e.g., 2013 Jan. 1 to 2015 Jun. 30) and will not be able to access data outside that range, which is especially useful for time series datasets.

In some implementations, a file's date range is determined using the filename. For example, filenames must be in the form 'YYYYMMDD.', 'YYYYMM.', or 'YYYY.' and directories must be in the form 'YYYYMMDD', 'YYYYMM', or 'YYYY'. If a directory has date_range checking enabled, and the file name matches a dated format then it is checked against the user's date restrictions. For directories with 'YYYY' and 'YYYYMM' format, the user has access to the directory if their date range includes at least one day in that year or month respectively. For files with 'YYYY' and 'YYYYMM' format, the user has access to the file if their date range includes that whole year or month. In order for a directory to have date_range checking enabled, extra attribute "date_restricted" must be set to 1.

In some implementations, the date restriction is applied for users that do not own the restricted files. For example, a user who owns the files under a date_restricted directory, can see all files that they own even if they are outside their date range restriction.

In some implementations, the date-range restrictions for a user can be configured using data_range_start and data_range_end in the appropriate configuration file.

Membership restrictions. In some implementations, and in order to support data hiding, the FSDB reads and caches user ids and group membership information. The described implementations can support Lightweight Directory Access Protocol (LDAP) or Active Directory is supported, which allows the FSDB to place limited trust in the client with regard to the user's group membership.

Client trust models. In some implementations, a client (e.g., CASFS client 330-1 in FIG. 3) can either be (1) an untrusted single-user client or (2) a trusted multi-user client. An untrusted single-user client connects to FSDB with user credentials, and is then limited to access files and directories within the user's UID and group membership as known by FSDB. This means that even a rogue or compromised client is unable to obtain further access beyond the user's credentials. A trusted multi-user client logs in under a system id, and in this mode, the uid/gid is trusted as being provided by the client and is used for access control checks.

In some implementations, in a single-user mode, a user can get superuser access if they are in admin group and set /cas/.proc/superuser to 1, whereas in a multi-user client, a user can get superuser access by running commands as root (sudo), as well as setting /cas/.proc/superuser to 1 if they are in the admin group.

Data integrity. In some implementations, data integrity is guaranteed using checksums coordinated with the metadata server.

In some implementations, CASFS leverages the scalability and aggregate throughput of storage servers (e.g., AWS S3®) while retaining the convenience of NFS or clustered file systems. Aggressive local-disk caching allows CASFS to mimic local-disk performance on a working-set of files. Clients can be added or removed from the file system easily, much like mounting and/or unmounting NFSClients and can mount multiple CASFS file systems.

Deduplication. In some implementations, storage is based on content hashing which enables deduplication. All files that have the same content are stored as only one entity on the storage server, which is implemented by keeping a reference count to all files on the storage server and only deleting objects after all of their references are removed. This feature advantageously results in reduced storage and reduced complexity. It also has the advantage of reducing object creation and deletion requests to the storage, thereby enhancing performance. Both storage space and storage requests are costly on cloud-based storage servers and this deduplication helps minimize these costs as well.

Caching. In some implementations, CASFS uses a configurable amount of local storage space for caching. Once this limit is exceeded a caching algorithm is employed to manage and rotate items in and out of cache depending on the scenario. In an example, the oldest data may be deleted from the local cache and uploaded back onto the storage server. In another example, data that is available on storage servers that are geographically close to the location of the client can be prioritized for deletion because that data can be retrieved more easily.

In some implementations, clients cache metadata differently for recently modified files compared to files that were modified very long ago. In the former case, caching metadata is performed on a sliding scale, e.g., from very short to around 2 seconds. In the latter case (i.e., for files that were modified over two hours ago) are cached indefinitely, and a notification is pushed to all clients using these files when these files are changed.

In some implementations, for large files (e.g., with a size greater than 1 GB or with estimated download times of greater than 10 seconds) that are read serially, a streaming mode can be enabled, wherein only a small amount of data is cached in memory and passed directly to the client as requested. However, if the client request pattern jumps too much (e.g., more than 10 times), streaming is disabled for that file and operation is reverted to usual on-disk caching.

Multi-region storage. In some implementations, data can be on different storage types (GPFS™ or local storage, AWS S3®, etc.), as well as can be stored in different regions (e.g., as in AWS S3®). In some implementations, geo-replication can be performed, which copies certain files to a storage server that is physically located closer to a client that uses those files.

Direct access to storage servers. In some implementations, files stored on the one or more storage servers (both local and cloud-based) are not manipulated by the file system and can be directly accessed with storage authentication.

User quota. In some implementations, the per user storage quota is specified in bytes or number of files stored, which provides control over storage costs.

Audit logging. In some implementations, access to files and modifications are audited per user and are centralized as well as stored locally on each client. This enables costs and budgets for users of a client terminal to be tracked (using, for example, CASTR in FIG. 4B).

Metrics. In some implementations, the number of file system operations carried out per user at any given time is collected via software applications used for event monitoring and alerting (e.g., Prometheus or Ganglia), which can be used for load monitoring and statistics.

Transfer and validation efficiency. In some implementations, the adaptive threshold value changes during the operation of CASFS to improve the efficiency of file transfers between the client terminals and the storage servers. The adaptive threshold value is based on one or more of: a source data set of the file, a type of data in the file, an application that generated the file, an application that is using the file, a time at which the file was created, a creator of the file, an access frequency of the file, a time that the file was most recently edited, or an average time taken to access the file across a subset of users (e.g., which in some cases, may be all users).

In some implementations, a frequently used file, which would typically be stored using a unique identifier (e.g., UUID) based only on its size, is stored using content hashing because this enables any changes to the file to be verified more quickly. If the use of the file decreases over time, the adaptive threshold value may change again to revert back to storing this file using the unique identifier instead of content hashing. Thus, this feedback-based adaptation of the threshold improves the functioning of the file system.

In some implementations, a file authored by a particular individual can be stored using content hashing, irrespective of its size. For example, if a lead member of a team creates a dataset that is used by all the other teams, then storing this file using content hashing enables rapid verification of any changes to its contents. Similarly, a file created and maintained by the Chief Technical Officer (CTO) of the company may be stored using content hashing. In these examples, the adaptive threshold value is modified such that a comparison of the size of the file with the threshold will results in using content hashing to generate the identifier for that file.

Example Implementations for Distributed Data Storage and Access

In an example, the described distributed data storage and access systems can be used for quantitative research, wherein different groups (or teams) access historical financial data to develop models that predict whether an investment will do well or not. In this scenario, groups are encouraged to develop creative independent solutions, which necessitates each group not knowing what data another group has accessed. The described implementations advantageously enable groups to work independently (by allowing separate access for each group), keep track of their budgets and costs (e.g., using CASTR as described in FIG. 4B), and provide access to petabytes of historical data through a file system that can access multiple storage systems on the backend (even hosted by different vendors).

Figure 5:
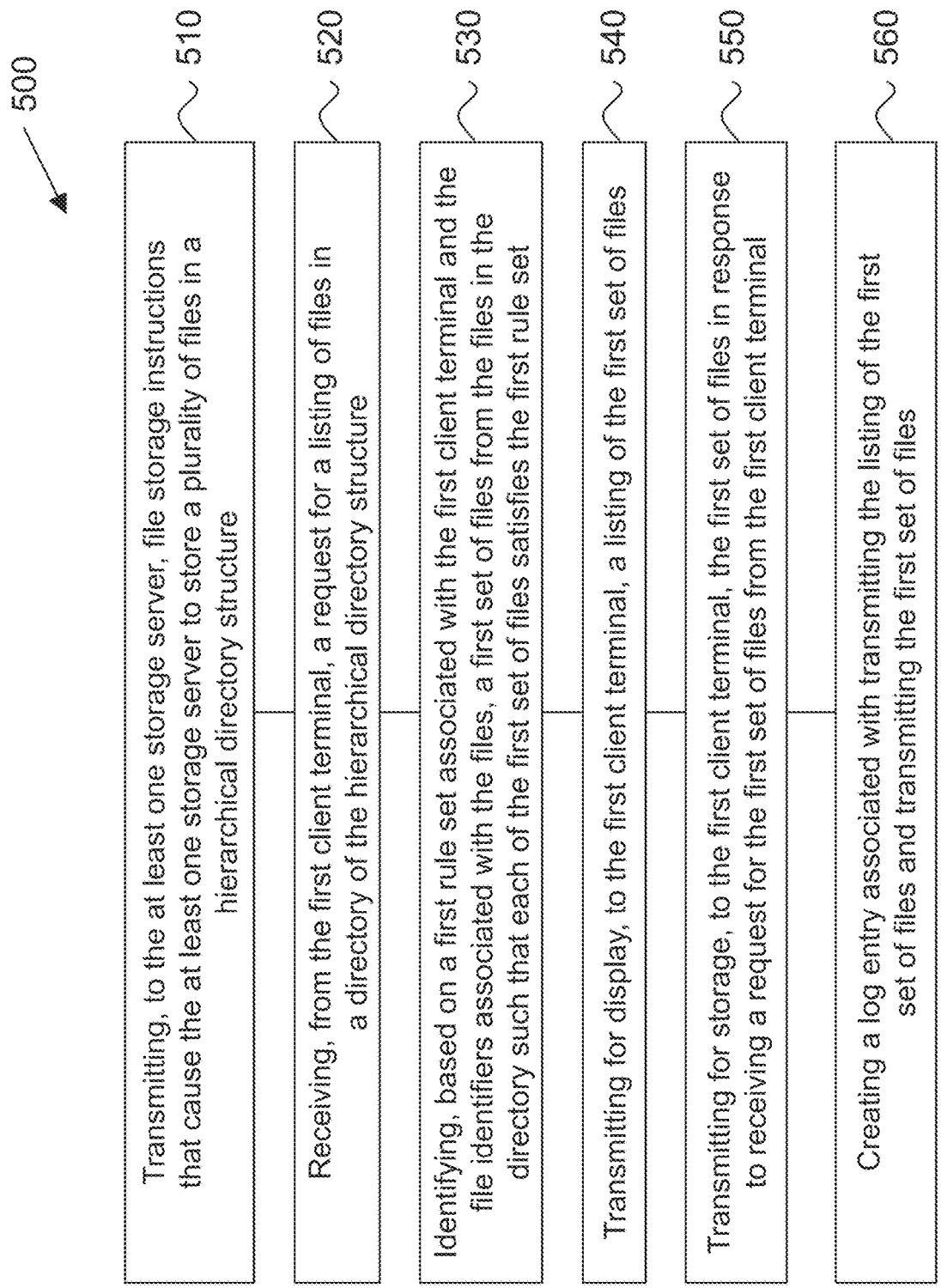
FIG. 5 shows a flowchart of an exemplary method for optimizing file storage in a distributed data storage and access system, in accordance with implementations of the present technology.

FIG. 5 shows a flowchart of an example of a method 500 for optimizing file storage in a distributed data storage and access system. The method 500 includes, at operation 510, transmitting, to the at least one storage server, file storage instructions that cause the at least one storage server to store a plurality of files in a hierarchical directory structure.

In some implementations, the file storage instructions cause the at least one storage server, as part of storing the plurality of files, to automatically associate a file identifier to the file based on comparing a size of the file to an adaptive threshold value. In response to the size of the file being less than the adaptive threshold value, the file identifier is set to a first identifier using a hash value of the file, and in response to the size being greater than or equal to the adaptive threshold value, the file identifier is set to a second identifier using at least a timestamp of the metadata server. In some implementations, the adaptive threshold value is based on at least two of: a source data set of the file, a type of data in the file, an application that generated the file, or an application that is using the file.

In some implementations, the adaptive threshold value is selected and/or adapted based on a computation/de-duplication tradeoff. For example, for a system that is likely to have many duplicated large files (e.g., an image database), the adaptive threshold value is set to a larger value since the computation cost of hashing may be worth the deduplication benefits. In an example, small files are more likely to be duplicated than larger files.

In some implementations, the file identifier can be used to optimize various facets of the present technology. In one example, if the file identifier is the first identifier that uses the hash value of the file, the client terminal and/or the metadata server can directly use the file identifier to prevent duplication. A hash value of a local file can be compared to the file identifier and if they match, the local file is not transmitted to the storage server. In another example, if the file identifier is based on the timestamp of the metadata server, the client terminal and/or metadata server can directly identify that the file has a size larger than the adaptive threshold value, and can configure for that file to be transmitted in portions (or chunks), which increases the probability of successful transmission of that file. In some implementations, the file identifier set using the hash value of the file can be used to organize (or categorize) the files. For example, prior to computing the hash value, the contents of the file can be pre-processed to enable similar files to generate hash values in a range that can be grouped together.

In some implementations, the first client terminal is configured to store the first set of files and the associated file identifiers in a local cache. This allows the first client terminal to immediately access the first set of files on an as-needed basis. However, due to the local cache being limited in size, the first client terminal can delete a subset of the files that are being used less frequently than the others. In other implementations, one or more files that are available on storage servers that are geographically close to the first client terminal are deleted because the latency associated with requesting that particular file is minimal compared to requesting that file from a server that is geographically distant from the first client terminal.

In some implementations, the first client terminal is configured to check, prior to storing the first set of files, whether a size of an available portion of the local cache is greater than the size of the first set of files, and in response to the size of the available portion being less than the size of the first set of files, (a) identify a second set of files in the local cache such that each of the second set of files comprises an access timestamp that is earlier than an access timestamp of any other file stored in the local cache, and (b) delete one or more of the second set of files from the local cache until the size of the available portion is greater than the size of the first set of files.

The method 500 includes, at operation 520, receiving, from the first client terminal, a request for a listing of files in a directory of the hierarchical directory structure. As discussed above, using a hierarchical directory structure advantageously enables filters to be deployed to ensure client terminals can only access the files that they have permissions to access. In an example, a directory listing request by a client terminal may result in only a portion of all the files in that directory being provided to the client terminal due to a lower level of access.

The method 500 includes, at operation 530, identifying, based on a first rule set associated with the first client terminal and the file identifiers associated with the files, a first set of files from the files in the directory such that each of the first set of files satisfies the first rule set. In some implementations, the first rule set includes an access rule set and a security rule set. In an example, the access rule set includes a type of login of the first client device, which can be either a single tenant login with access to one or more leaf nodes of the hierarchical directory structure or a multi-tenant login with access to a root node of the hierarchical directory structure. In another example, the security rule set includes filtering based on at least one of a creation date of each of the files in the directory, a last modified date of each of the files in the directory, one or more memberships assigned to the first client device, or one or more permissions assigned to the first client device.

The method 500 includes, at operation 540, transmitting for display, to the first client terminal, a listing of the first set of files, and at operation 550, transmitting for storage, to the first client terminal, the first set of files in response to receiving a request for the first set of files from the first client terminal. In some implementations, the first client terminal (or first project team) can receive the first set of files, use a pipeline interpreter to process the first set of files, thereby generating a modified set of files, each of which has a size less than the adaptive threshold value. In this example, the first client terminal can compute a hash value of the modified set of files, and the hash values can be compared to the file identifiers in the storage server to determine whether those files already exist, e.g., a different client terminal (or different/second project team) processed the data identically and uploaded the modified files to the storage server before the first client terminal could complete its processing. This advantageously mitigates duplication of data on the storage server.

The method 500 includes, at operation 560, creating a log entry associated with transmitting the listing of the first set of files and transmitting the first set of files. In some implementations, the log entry (or more generally, a file/log audit) can be used to monitor the files accessed by each client terminal and generate an associated cost, which can be compared to a budget for that client terminal. In an example, if the client terminal is nearing a budget cap, the metadata server can provide a warning to the client terminal. In another example, if the budget cap is exceeded, the metadata server can cut off data access for that client terminal. Alternatively, the client terminal may now be allowed to only access files with small file sizes, which can be identified by the file identifiers being set using the hash value of the file.

Implementations of the present technology include an example system for optimizing file storage in a distributed data storage and access system. The system includes a metadata server, a first client terminal communicatively coupled to the metadata server, and at least one storage server communicatively coupled to the metadata server and the first client terminal, wherein the at least one storage server is configured to store a plurality of files in a hierarchical directory structure, each of the plurality of files being stored with a file identifier, wherein, for each file of the plurality of files, a first processor associated with the at least one storage server is configured, as part of storing the plurality of files, to automatically associate the file identifier to the file based on comparing a size of the file to an adaptive threshold value, wherein the adaptive threshold value is based on two or more of a source data set of the file, a type of data in the file, an application that generated the file, or an application that is using the file, wherein, in response to the size of the file being less than the threshold value the file identifier is set to a first identifier using a hash value of the file, and wherein, in response to the size being greater than or equal to the adaptive threshold value, the file identifier is set to a second identifier using at least a timestamp of the metadata server, wherein a second processor associated with the metadata server is configured to receive, from the first client terminal, a request for a listing of files in a directory of the hierarchical directory structure, identify, based on a first rule set associated with the first client terminal and the file identifiers associated with the files, a first set of files from the files in the directory such that each of the first set of files satisfies the first rule set, wherein the first rule set comprises a security rule set and an access rule set, transmit for display, to the first client terminal, a listing of the first set of files, transmit for storage, to the first client terminal, the first set of files in response to receiving a request for the first set of files from the first client terminal, wherein a size of the first set of files is less than a size of the files in the directory, and create a log entry associated with transmitting the listing of the first set of files and transmitting the first set of files.

Implementations of the present technology include another example system for optimizing file storage in a distributed data storage and access system. The system includes a centralized server coupled to a first client device and at least one storage server, wherein the centralized server is configured to transmit, to the at least one storage server, file storage instructions that cause the at least one storage server to store a plurality of files in a hierarchical directory structure, wherein each of the plurality of files is stored with a file identifier, and wherein the file storage instructions cause the at least one storage server, as part of storing the plurality of files, to automatically associate the file identifier to the file based on comparing a size of the file to an adaptive threshold value, wherein the adaptive threshold value is based on two or more of a source data set of the file, a type of data in the file, an application that generated the file, or an application that is using the file, wherein, in response to the size of the file being less than the adaptive threshold value, the file identifier is set to a first identifier using a hash value of the file, and wherein, in response to the size being greater than or equal to the adaptive threshold value, the file identifier is set to a second identifier using at least a timestamp of the metadata server, receive, from the first client device, a request for a listing of files in a directory of the hierarchical directory structure, identify, based on a first rule set associated with the first client device and the file identifiers associated with the files, a first set of files from the files in the directory such that each of the first set of files satisfies the first rule set, wherein the first rule set comprises a security rule set and an access rule set, transmit for display, to the first client device, a listing of the first set of files, transmit for storage, to the first client device, the first set of files in response to receiving a request for the first set of files from the first client device, wherein a size of the first set of files is less than a size of the files in the directory, and create a log entry associated with transmitting the listing of the first set of files and transmitting the first set of files.

It is intended that the specification, together with the drawings, be considered exemplary only, where exemplary means an example and, unless otherwise stated, does not imply an ideal or a preferred embodiment. As used herein, "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A system for optimizing file storage in a distributed data storage and access system, comprising:
   a metadata server;
   a first client terminal communicatively coupled to the metadata server; and
   at least one storage server communicatively coupled to the metadata server and the first client terminal,
   wherein the at least one storage server is configured to store a plurality of files in a hierarchical directory structure, each of the plurality of files being stored with a file identifier,
   wherein, for each file of the plurality of files, a first processor associated with the at least one storage server is configured, as part of storing the plurality of files, to:
      automatically associate, for file storage or retrieval, the file identifier to a file based on comparing a size of the file to an adaptive threshold value, wherein the adaptive threshold value is based on two or more of: a source data set of the file, a type of data in the file, an application that generated the file, or an application that is using the file;
      wherein, in response to the size of the file being less than the adaptive threshold value the file identifier is set to a first identifier using a hash value of the file such that the file can be uniquely identified using the first identifier; and
      wherein, in response to the size being greater than or equal to the adaptive threshold value, the file identifier is set to a second identifier using at least a timestamp of the metadata server such that the file can be uniquely identified using the second identifier;
   wherein a second processor associated with the metadata server is configured to:
      receive, from the first client terminal, a request for a listing of files in a directory of the hierarchical directory structure;
      identify, based on a first rule set associated with the first client terminal and the file identifier associated with each of the files, a first set of files from the files in the directory such that each of the first set of files satisfies the first rule set, wherein the first rule set comprises a security rule set and an access rule set;
      transmit for display, to the first client terminal, a listing of the first set of files;
      transmit for storage, to the first client terminal, the first set of files in response to receiving a request for the first set of files from the first client terminal, wherein a size of the first set of files is less than a size of the files in the directory; and
      create a log entry associated with transmitting the listing of the first set of files and transmitting the first set of files.

2. The system of claim 1, wherein the first client terminal is configured to:
   store the first set of files and associated file identifiers in a local cache.

3. The system of claim 2, wherein the first client terminal is further configured to:
   compare metadata associated with the first set of files to metadata information corresponding to the first set of files on the metadata server; and
   in response to the metadata being different from the metadata information, request at least one file of the first set of files from the metadata server.

4. The system of claim 2, wherein the first client terminal is further configured to:
   check, prior to storing the first set of files, whether a size of an available portion of the local cache is greater than the size of the first set of files; and
   in response to the size of the available portion being less than the size of the first set of files, (a) identify a second set of files in the local cache such that each of the second set of files comprises an access timestamp that is earlier than an access timestamp of any other file stored in the local cache, and (b) delete one or more of the second set of files from the local cache until the size of the available portion is greater than the size of the first set of files.

5. The system of claim 2, wherein the first client terminal is further configured to:
   perform, using a pipeline interpreter, one or more operations on at least one of the first set of files to generate a modified file with a size less than the adaptive threshold value;
   determine, based on a hash value of the modified file, whether the modified file is stored on the at least one storage server; and in response to the modified file not being stored, transmit metadata associated with the modified file to the metadata server and the modified file to the at least one storage server.

6. The system of claim 1, further comprising:
a second client terminal, communicatively coupled to the metadata server and the at least one storage server, configured to:
transmit, to the metadata server, the request for the listing of files in the directory of the hierarchical directory structure;
receive, from the metadata server, a listing of a second set of files,
wherein each of the second set of files satisfies a second rule set associated with the second client terminal, and wherein a size of the second set of files is less than the size of the files in the directory.

7. The system of claim 6, wherein the metadata server is further configured to:
configure the first rule set to be different from the second rule set such that a first project team using at least the first client terminal cannot view the second set of files being used by a second project team using at least the second client terminal.

8. A system for optimizing file storage in a distributed data storage and access system, comprising:
a centralized server coupled to a first client device and at least one storage server,
wherein the centralized server is configured to:
transmit, to the at least one storage server, file storage instructions that cause the at least one storage server to store a plurality of files in a hierarchical directory structure, wherein each of the plurality of files is stored with a file identifier, and wherein the file storage instructions cause the at least one storage server, as part of storing the plurality of files, to:
automatically associate, for file storage or retrieval, the file identifier to a file based on comparing a size of the file to an adaptive threshold value, wherein the adaptive threshold value is based on two or more of: a source data set of the file, a type of data in the file, an application that generated the file, or an application that is using the file;
wherein, in response to the size of the file being less than the adaptive threshold value, the file identifier is set to a first identifier using a hash value of the file such that the file can be uniquely identified using the first identifier, and
wherein, in response to the size being greater than or equal to the adaptive threshold value, the file identifier is set to a second identifier using at least a timestamp of the centralized server such that the file can be uniquely identified using the second identifier;
receive, from the first client device, a request for a listing of files in a directory of the hierarchical directory structure;
identify, based on a first rule set associated with the first client device and the file identifier associated with each of the files, a first set of files from the files in the directory such that each of the first set of files satisfies the first rule set, wherein the first rule set comprises a security rule set and an access rule set;
transmit for display, to the first client device, a listing of the first set of files;
transmit for storage, to the first client device, the first set of files in response to receiving a request for the first set of files from the first client device, wherein a size of the first set of files is less than a size of the files in the directory; and
create a log entry associated with transmitting the listing of the first set of files and transmitting the first set of files.

9. The system of claim 8, wherein the access rule set comprises a type of login of the first client device.

10. The system of claim 9, wherein the type of login comprises a single tenant login with access to one or more leaf nodes of the hierarchical directory structure or a multi-tenant login with access to a root node of the hierarchical directory structure.

11. The system of claim 8, wherein the security rule set comprises filtering based on at least one of a creation date of each of the files in the directory, a last modified date of each of the files in the directory, one or more memberships assigned to the first client device, or one or more permissions assigned to the first client device.

12. The system of claim 8, wherein accessing one or more of the files in the directory is associated with a cost, and wherein the centralized server is further configured to:
generate, based on the log entry, a cost associated with accessing the first set of files; and
determine whether the cost has exceeded an allocated budget assigned to the first client device.

13. The system of claim 8, wherein the at least one storage server comprises a first storage server at a first geographic location and a second storage server at a second geographic location different from the first geographic location.

14. The system of claim 13, wherein the first client device is located closer to the first geographic location, and wherein the centralized server is configured to copy a second set of files related to the first set of files to the first geographic location.

15. The system of claim 8, wherein the centralized server is further coupled to a second client device, and wherein the centralized server is further configured to:
receive, from the second client device, the request for the listing of files in the directory of the hierarchical directory structure; and
transmit, to the second client device, a listing of a second set of files,
wherein each of the second set of files satisfies a second rule set associated with the second client device, and wherein a size of the second set of files is less than the size of the files in the directory.

16. The system of claim 15, wherein the centralized server is further configured to:
configure the first rule set to be different from the second rule set such that a first project team using at least the first client device cannot view the second set of files being used by a second project team using at least the second client device.

17. A non-transitory computer-readable storage medium having instructions stored thereupon for optimizing file storage in a distributed data storage and access system, the instructions when executed by a data processing apparatus, cause the data processing apparatus to perform operations comprising:
transmitting, by a centralized server to at least one storage server, file storage instructions that cause the at least one storage server to store a plurality of files in a hierarchical directory structure, wherein each of the plurality of files is stored with a file identifier, and wherein the file storage instructions cause the at least one storage server, as part of storing the plurality of files, to:
   automatically associate, for file storage or retrieval, the file identifier to a file based on comparing a size of the file to an adaptive threshold value, wherein the adaptive threshold value is based on two or more of: a source data set of the file, a type of data in the file, an application that generated the file, or an application that is using the file;
   wherein, in response to the size of the file being less than the adaptive threshold value, the file identifier is set to a first identifier using a hash value of the file such that the file can be uniquely identified using the first identifier, and
   wherein, in response to the size being greater than or equal to the adaptive threshold value, the file identifier is set to a second identifier using at least a timestamp of the centralized server such that the file can be uniquely identified using the second identifier;
receiving, from a first client device, a request for a listing of files in a directory of the hierarchical directory structure;
identifying, based on a first rule set associated with the first client device and the file identifier associated with each of the files, a first set of files from the files in the directory such that each of the first set of files satisfies the first rule set, wherein the first rule set comprises a security rule set and an access rule set;
transmitting for display, to the first client device, a listing of the first set of files;
transmitting for storage, to the first client device, the first set of files in response to receiving a request for the first set of files from the first client device, wherein a size of the first set of files is less than a size of the files in the directory; and
creating a log entry associated with transmitting the listing of the first set of files and transmitting the first set of files.

18. The non-transitory computer-readable storage medium of claim 17, wherein the access rule set comprises a type of login of the first client device.

19. The non-transitory computer-readable storage medium of claim 18, wherein the type of login comprises a single tenant login with access to one or more leaf nodes of the hierarchical directory structure or a multi-tenant login with access to a root node of the hierarchical directory structure.

20. The non-transitory computer-readable storage medium of claim 17, wherein the security rule set comprises filtering based on at least one of a creation date of each of the files in the directory, a last modified date of each of the files in the directory, one or more memberships assigned to the first client device, or one or more permissions assigned to the first client device.

21. The non-transitory computer-readable storage medium of claim 17, wherein accessing one or more of the files in the directory is associated with a cost, and wherein the instructions further cause the data processing apparatus to perform operations comprising:
   generating, based on the log entry, a cost associated with accessing the first set of files; and
   determining whether the cost has exceeded an allocated budget assigned to the first client device.

22. The non-transitory computer-readable storage medium of claim 17, wherein the at least one storage server comprises a first storage server at a first geographic location and a second storage server at a second geographic location different from the first geographic location.

23. The non-transitory computer-readable storage medium of claim 22, wherein the first client device is located closer to the first geographic location, and wherein the centralized server is configured to copy a second set of files related to the first set of files to the first geographic location.

24. The non-transitory computer-readable storage medium of claim 17, wherein the centralized server is further coupled to a second client device, and wherein the instructions further cause the data processing apparatus to perform operations comprising:
   receiving, from the second client device, the request for the listing of files in the directory of the hierarchical directory structure; and
   transmitting, to the second client device, a listing of a second set of files,
   wherein each of the second set of files satisfies a second rule set associated with the second client device, and wherein a size of the second set of files is less than the size of the files in the directory.

25. The non-transitory computer-readable storage medium of claim 17, wherein the instructions further cause the data processing apparatus to perform operations comprising:
   configuring the first rule set to be different from the second rule set such that a first project team using at least the first client device cannot view the second set of files being used by a second project team using at least the second client device.

26. A method for optimizing file storage in a distributed data storage and access system, comprising:
   transmitting, by a centralized server to at least one storage server, file storage instructions that cause the at least one storage server to store a plurality of files in a hierarchical directory structure, wherein each of the plurality of files is stored with a file identifier, and wherein the file storage instructions cause the at least one storage server, as part of storing the plurality of files, to:
     automatically associate, for file storage or retrieval, the file identifier to a file based on comparing a size of the file to an adaptive threshold value, wherein the adaptive threshold value is based on two or more of: a source data set of the file, a type of data in the file, an application that generated the file, or an application that is using the file;
     wherein, in response to the size of the file being less than the adaptive threshold value, the file identifier is set to a first identifier using a hash value of the file such that the file can be uniquely identified using the first identifier, and
     wherein, in response to the size being greater than or equal to the adaptive threshold value, the file identifier is set to a second identifier using at least a timestamp of the centralized server such that the file can be uniquely identified using the second identifier;
   receiving, from a first client device, a request for a listing of files in a directory of the hierarchical directory structure;
   identifying, based on a first rule set associated with the first client device and the file identifier associated with each of the files, a first set of files from the files in the directory such that each of the first set of files satisfies the first rule set, wherein the first rule set comprises a security rule set and an access rule set;

transmitting for display, to the first client device, a listing of the first set of files;

transmitting for storage, to the first client device, the first set of files in response to receiving a request for the first set of files from the first client device, wherein a size of the first set of files is less than a size of the files in the directory; and creating a log entry associated with transmitting the listing of the first set of files and transmitting the first set of files.

27. The method of claim 26, wherein the access rule set comprises a type of login of the first client device, wherein the type of login comprises a single tenant login with access to one or more leaf nodes of the hierarchical directory structure or a multi-tenant login with access to a root node of the hierarchical directory structure, and wherein the security rule set comprises filtering based on at least one of a creation date of each of the files in the directory, an last modified date of each of the files in the directory, one or more memberships assigned to the first client device, or one or more permissions assigned to the first client device.

28. The method of claim 26, wherein the at least one storage server comprises a first storage server at a first geographic location and a second storage server at a second geographic location different from the first geographic location.

29. The method of claim 28, wherein the first client device is located closer to the first geographic location, and wherein the centralized server is configured to copy a second set of files related to the first set of files to the first geographic location.

* * * * *